N. Nolan. Feed Water Regulator.
No. 121,122. Patented Nov. 21, 1871.
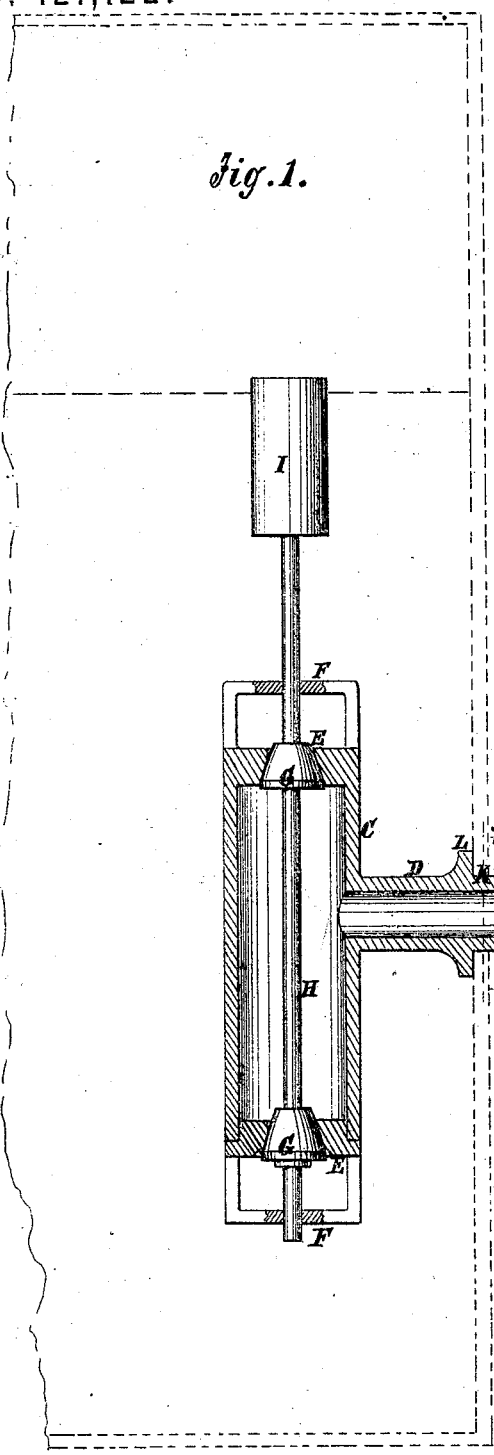
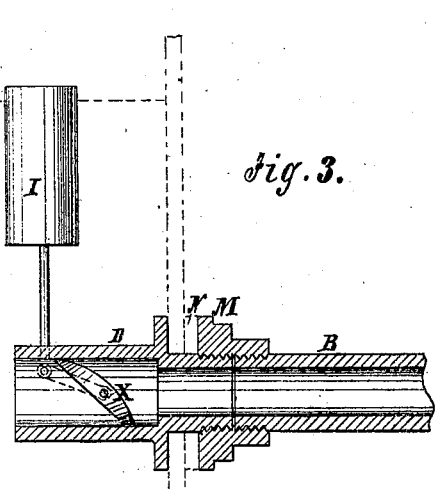
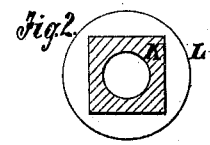
Witnesses:
A. Bennenendorf.
Wm. H. C. Smith.
Inventor:
N. Nolan
per Munn & Co.
Attorneys.

UNITED STATES PATENT OFFICE.

NICHOLAS NOLAN, OF NEW YORK, N. Y.

IMPROVEMENT IN FEED-WATER REGULATORS.

Specification forming part of Letters Patent No. 121,122, dated November 21, 1871; antedated November 6, 1871.

*To all whom it may concern:*

Be it known that I, NICHOLAS NOLAN, of the city, county, and State of New York, have invented a new and Improved Feed-Water Regulator; and I do hereby declare that the following is a full, clear, and exact description thereof, which will enable others skilled in the art to make and use the same, reference being had to the accompanying drawing forming part of this specification.

My invention relates to feed-water regulators for steam-boilers; and consists in the improvement first hereinafter described and then clearly pointed out in the claim.

Figure 1 is a section of one arrangement of apparatus for carrying out my invention. Fig. 2 is a section of the regulating attachment taken on the line $x\ x$ of Fig. 1; and Fig. 3 is a section showing the attachment to a throttle-valve.

Similar letters of reference indicate corresponding parts.

A represents the shell of the boiler, and B the feed-pipe, connecting with the pump, which is to be always in motion, and should be an independent steam-pump. C is a hollow cylinder, having a short pipe, D, opening into one side, and an opening, E, at each end. It also has by preference valve-stem supports F, one at each end. The pipe D is connected to the feed-pipe, and the openings at the ends of the cylinder are fitted up for seats for valves G, one on the inside and the other on the outside, so that being both connected to the rod H they will open and close both at the same time and alike. This rod H has a float, I, on it for being suspended in the water to open and close the valves, according to the height of the water, and thereby regulate the flow from the pump, which will be caused to run slower as the passages are closed by the valves.

In this example the pipe D has a square shank, K, where it passes through the boiler shell, which has a square hole for holding it from turning to maintain the cylinder C in the vertical position. It has a collar, L, which is clamped up against the boiler shell by the hollow nut M, to which the feed-pipe is connected. A washer, N, may be introduced between the nut M and the boiler.

Having thus described my invention, I claim as new and desire to secure by Letters Patent—

The vertical water-chamber C, valve-seated at E, held fixedly within the water of the boiler, and connected with a valved-rod passing therethrough, and also having a float, I, at the upper end thereof adjusted to the water-line of the boiler, for the purpose of automatically feeding water to the boiler, as described.

NICHOLAS NOLAN.

Witnesses:
GEO. W. MABEE,
ALEX. F. ROBERTS.           (148)